United States Patent [19]

Boisset et al.

[11] 4,256,334
[45] Mar. 17, 1981

[54] UNION FOR TUBES HAVING A SMOOTH END

[76] Inventors: Michel L. Boisset, Le Creux Guillien, Beauregard, 01480 Jassans Riottier; Louis P. Martelli, Villa Jac-Her-Sy, Lotissement La Manet, 83400 Hyeres, both of France

[21] Appl. No.: 66,641

[22] Filed: Aug. 15, 1979

[30] Foreign Application Priority Data

Sep. 5, 1978 [FR] France ............................. 78 25976

[51] Int. Cl.³ .................... F16L 19/00; F16L 33/20
[52] U.S. Cl. .................................. 285/247; 285/343
[58] Field of Search .............. 285/343, 382.7, 342, 285/341, 247, 248, 249

[56] References Cited

U.S. PATENT DOCUMENTS

| 2,179,127 | 11/1939 | Lauer | 285/341 |
|---|---|---|---|
| 2,738,994 | 3/1956 | Kreidel et al. | 285/342 X |
| 3,006,558 | 10/1961 | Jacobs | 285/343 |
| 3,195,933 | 7/1965 | Jacobs | 285/247 |
| 3,325,192 | 6/1967 | Sullivan | 285/341 X |
| 3,977,708 | 8/1976 | Jopp | 285/342 |
| 4,133,312 | 1/1979 | Burd | 285/423 X |

FOREIGN PATENT DOCUMENTS

| 1238734 | 4/1967 | Fed. Rep. of Germany | 285/341 |
|---|---|---|---|
| 36719 | 11/1965 | German Democratic Rep. | 285/343 |
| 1016347 | 1/1966 | United Kingdom | 285/343 |

*Primary Examiner*—Thomas F. Callaghan
*Attorney, Agent, or Firm*—Bucknam and Archer

[57] ABSTRACT

The invention relates to unions for tubes adapted to hermetically connect a smooth end of a tube on a connecting piece comprising a flared end. These unions comprise an anchoring and sealing ring which is constituted by an annular lip incorporated in the body of the union and which presents, in its rear part, at least one peripheral recess which is adapted to facilitate the flexion of the lip towards the axis.

12 Claims, 6 Drawing Figures

UNION FOR TUBES HAVING A SMOOTH END

The present invention relates to unions adapted to connect the smooth end of a tube on the end of another tube or on the terminal of an apparatus.

The technical sector of the invention is that of the construction of accessories for connecting tubing, pipes, fittings or valves.

Unions for flexible pipes are known, comprising a radially deformable conical anchoring ring, of which the edge penetrates in the periphery of the pipe when the union is tightened, this ensuring the mechanical fixation of the union on the end of the pipe.

French Pat. No. 71 25987 describes such a union in which the anchoring ring is a piece separate from the body of the union and cannot ensure the tightness between the union and the tube.

French Pat. No. 864 880 also describes a union which comprises an anchoring bushing, separate from the body of the union, which comes into abutment on a shoulder of the tube or which cuts in the tube. At rest, this anchoring bushing is cylindrical. When the union is assembled, the bushing shrinks and bends. The tightness of the union is not effected by the anchoring bushing but by a shoulder forming a seat against which the end of the tube comes into tight contact.

U.S. Pat. No. 3 195 933 (A. W. Jacobs) describes a coupling made of polyamide (nylon) adapted to connect flexible tubes, for example made of polyethylene. This coupling comprises a conical anchoring piece fast with the body of the coupling of which the front end comprises an inwardly extending annular flange, of which the edge is cutting and bites in the tube. The tightness of the connection is effected by the engagement of the end of the tube in a groove of the terminal on which it is desired to connect the tube. The anchoring piece may be a piece separate from the body of the coupling.

The preceding description of the prior art shows that tube unions are known which comprise an anchoring piece, fast or not with the body of the union, which serves to ensure the mechanical connection between the body of the union and a tube made of flexible plastics material or made of ductile metal, but, in these known unions, the connection between the anchoring piece and the periphery of the tube is not tight, with the result that sealing means must be provided.

It is an object of the present invention to provide unions, adapted to connect the smooth end of a pipe made of flexible plastics material or of a tube made of a ductile material, on the end of another pipe or tube or a terminal of an apparatus, which unions comprise a lip incorporated in the union, which repels the material of the pipe or tube, forming a bead when the union is assembled, so that said lip acts both as seal and as mechanical anchoring ring and that a union in one piece is thus obtained, which may be adapted to any terminal comprising an inner shoulder and a flared end.

A tube union according to the invention is adapted to connect a smooth end of a tube on a connecting piece comprising a flared end and mechanical assembly means, which cooperate with assembly means carried by the front end of the union, these assembly means being for example threads or flanges and bolts.

A union according to the invention comprises, in known manner, a cylindrical body which is pierced, at the rear end, with a first axial bore having a diameter slightly greater than the outer diameter of the tube and of which one end is engaged in said bore. The body of the union is also pierced, at the front end, with a second axial bore of which the diameter is greater than the outer diameter of the tube, with the result that it defines therewith an annular cavity in which penetrates the flared end of the connecting piece.

The body of the union further comprises an anchoring ring, in the form of an annular lip, incorporated in the body which is located in said annular cavity.

The objects of the invention are attained by means of unions of this type in which the rear part of the annular lip which is attached to the body of the union comprises at least one peripheral recess which extends all around the rear end of said lip and which is intended to facilitate the flexion of said lip towards the axis from said recess.

According to a first embodiment, the inner diameter of the rear part of said annular lip is greater than the diameter of said first bore, so that, at rest, the inner face of said annular lip is separated from the outer face of the pipe by an annular recess. This annular recess extends axially over the whole length of said annular lip and is limited towards the front by the front edge of said lip of which the inner diameter is substantially equal, at rest, to the outer diameter of said tube.

The rear end of said lip, which is attached to said body, is in the form of a cylindrical ring of which the inner diameter is greater than the outer diameter of said tube.

The front end of said lip is in the form of a truncated washer of which the vertex is directed forwardly.

The semi-vertex angle $\gamma$ of said truncated washer is between 1° and 15°.

The front end of the annular lip is bevelled and the front face forms with the generatrices of the tube an obtuse angle $\alpha$ of between 100° and 120°.

The semi-vertex angle $\beta$ of the conical flare of the end of the connecting piece is between 15° and 40°.

According to a second embodiment, the rear part of the annular lip comprises a thinner portion which is defined by an outer peripheral groove and/or by an inner peripheral groove.

The invention results in a new product which is a tube union adapted to connect a tube made of flexible plastics material or of a ductile material on another tube or on the terminal of an apparatus comprising mechanical assembly means.

The unions according to the invention present the advantage of being able to be cast in one piece and of comprising no seal, nor anchoring ring separate from the body of the union. Moreover, the unions according to the invention do not need to be fixed in advance to the end of the tubes. The tight fixation of the union on the smooth end of the tube is produced at the same time as the union is tightened on the assembling piece.

The mechanical connection between the tube and the union may withstand considerable pulling forces. In fact, due to the conical washer form of the front end of the anchoring lip, when one pulls on the tube, the lip tends to close on the tube, this improving anchorage.

The invention will be more readily understood on reading the following description with reference to the accompanying drawings, in which.

Figure 1:
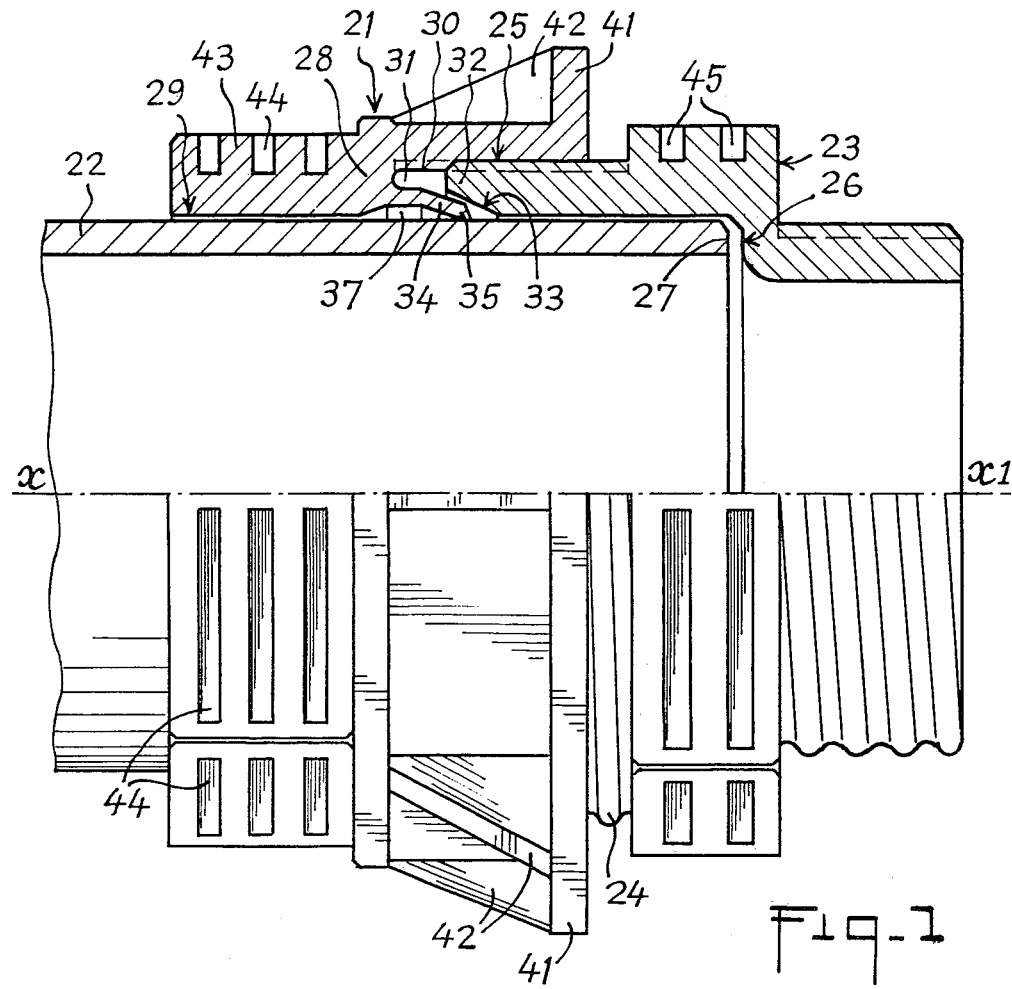
FIG. 1 is a half axial section of a union according to the invention in the course of assembly on a threaded terminal.

Referring now to the drawings, FIG. 1 shows a union, generally designated by reference 21, which is adapted to connect the smooth end of a pipe or tube 22, of axis x xl, on a connecting piece 23, which is, for example, the terminal of an apparatus or valve accessory. It is specified that the union 21 may also serve to connect, end to end, the end of a smooth tube 22 with the end of another tube. In this case, the connecting piece 23 is an intermediate element on each end of which a half-union 21 is connected.

In any case the connecting piece 23 comprises mechanical assembly means which cooperate with assembly means carried by the front end of the union 21. In the case of the Figure, these assembly means are constituted by a male thread 24 which cooperates with a female thread 25 of the union, but these assembly means could be replaced by equivalent means, for example by two flanges assembled together by bolts.

The connecting piece possibly comprises an inner shoulder 26 against which the end 27 of the tube 22 abuts. A tight contact is not sought between the end 27 and the shoulder 26 and it is therefore not necessary for the shoulder 26 to have a particular shape ensuring a tight contact. It suffices for it to serve as stop for the end 27 of the tube 22. It is optional for threaded unions.

The tube 22 is either a flexible pipe made of plastics material, for example polyethylene or polyvinyl chloride, or a tube made of ductile material, for example a lead or copper tube.

The union 21 comprises a cylindrical body 28, which is pierced, at the rear end, with an axial bore 29 of which the diameter is slightly greater than the outer diameter of the tube 22, which is engaged in the bore 29. The body 28 is also pierced, at the front end, with a second axial bore 30, of which the diameter is greater than the outer diameter of the tube 22, so that it determines with the outer wall of the tube an annular cavity 31.

The rear end 32 of the connecting piece 23 comprises a bevel forming a conical flare 33. This flared end penetrates in the cavity 31 when the union 26 is connected on the piece 23 and engages more and more deeply in the cavity 31 as the union 21 is tightened.

The union 21 further comprises an anchoring ring 34 having the form of an annular lip incorporated in the body 21, which lip surrounds the front end of the first bore and is located in said annular cavity 31.

The body 28 and the lip 34 form one piece which is preferably made by casting and which is made of a semi-rigid polymerisable resin, preferably acetal resin which presents the properties of rigidity, flexibility and possibility of injection moulding which are most suitable for making such a union.

Figure 2:
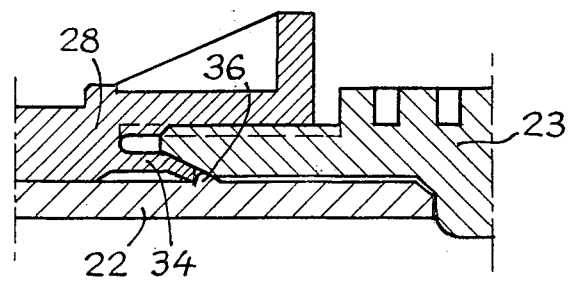
FIG. 2 is a partial section through the union after assembly.

When the threaded union is tightened on the connecting piece 23, the lip 34 abuts against the flared end 33, this provoking a bending, towards the axis, of the front edge 35 of the lip 34, which edge rests against the periphery of the tube 22 and repels the material towards the front, forming a peripheral bead 36 visible in FIG. 2, without cutting the tube. The bead 36 serves to anchor the union 21 mechanically on the smooth tube 22, so that the assembly can withstand the pulling forces to which it is normally subjected. At the same time, the contact between the front edge 35 and the tube 22 is a tight contact. Moreover, the contact between the outer face of the lip 34 and the bevel 33 is also tight.

To attain this result, the lip 34 presents certain characteristics. The inner diameter of the annular lip, in the rear part thereof, is greater than the diameter of said first bore, with the result that, at rest, i.e. before the front edge 35 is in contact with the conical flare 33, the inner face of the lip 34 is separated from the outer face of the tube by a space having the form of an annular recess 37. This annular recess 37 is limited, at the front, by the front edge 35 of the lip 34 of which the inner diameter is substantially equal to the outer diameter of the tube 22.

Figure 3:
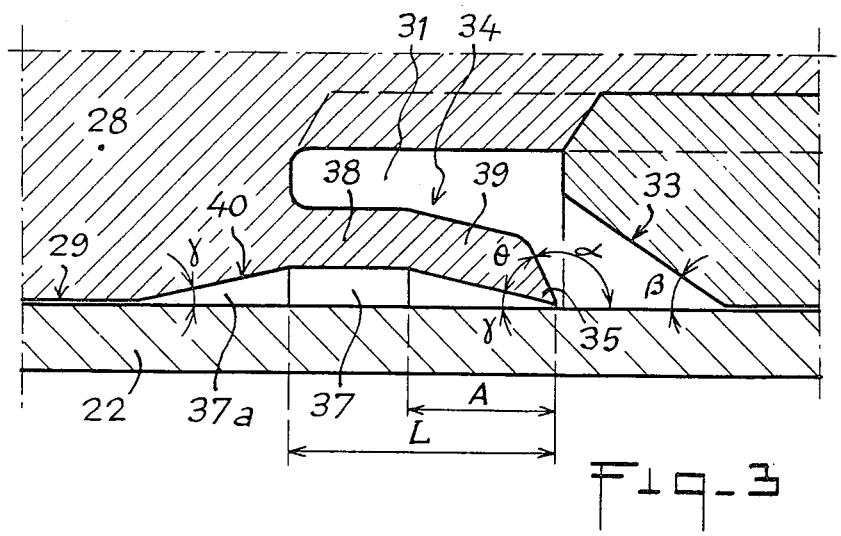
FIG. 3 is a partial section, on a larger scale, of a detail of FIG. 1.

FIG. 3 shows, on a larger scale the form of a preferred embodiment of the lip 34. The latter comprises a rear part 38 which is connected to the body 28, having the form of a cylindrical ring of which the inner diameter is greater than the outer diameter of the tube 22. The front part of the lip 34 presents the form of a truncated washer 39 of which the vertex is directed forwardly so that the inner and outer faces of said washer converge towards the axis x xl towards the front.

The smallest inner diameter of the washer 39 is substantially equal, at rest, to the outer diameter of the tube 22, so that the front edge 35 of the lip 34 is located at rest substantially in contact with the periphery of the tube. The inner diameter of the edge 35 is normally slightly greater than the outer diameter of the tube 22, but it may also be equal to or even slightly smaller as the tube 22 is engaged in the union from rear to front and, in this direction, it repels the lip 34 towards the outside.

The truncated washer 39 and the cylindrical ring 38 have the same thickness and the outer and inner walls of the ring and of the washer are connected to one another without discontinuity.

The semi-vertex angle $\gamma$ of the truncated washer is between 1° and 15°. The total axial length L, which is the length of the cylindrical ring 38 added to the length of the truncated washer 39, is between 5 mm and 20 mm and the axial length A of the conical washer 39 is between 1 mm and 10 mm, according to the diameter of the tube 22.

The end 35 of the lip 34 is bevelled and the front face forms with the generatrices of the tube 22 an obtuse angle $\alpha$ of between 100° and 120°. The angle of the bevel $\theta$ is between 45° and 80°.

The semi-vertex angle $\beta$ of the bevel 33 is between 15° and 40°. It is always greater than the angle $\gamma$.

All the above values of angle and length are very important to obtain the desired result, namely that the front edge 35 of the lip 34 repels the material of the tube 22 to form an anchoring and sealing bead without cutting the tube.

The annular recess 37 preferably comprises an extension 37a extending rearwardly of the rear end of the cylindrical ring. For example, the recess 37a is defined by a conical flare 40 of the wall of the bore 29 having its vertex towards the rear and having a semi-vertex angle $\gamma$ identical to the semi-vertex angle of the washer 39.

The union body comprises, at the front end, a peripheral flange 41 which may serve as connecting flange and which is reinforced by triangular ribs or gussets 42 which abut against the rear face of the flange 41 and which extend substantially over the length of the cavity 31. This flange and these ribs serve to reinforce the body of the union in the part which is subjected to considerable stresses during the deformation of the lip 34 in flexion.

In the case of a threaded union of large diameter, the presence of the cavity 31 and of the ribs 42 cause the outer diameter of the union to become too large to be able to comprise in this part a polygonal contour allowing the tightening of the union with a standardized spanner.

In this case, the union body comprises an extension 43 extending to the rear of the rear end of the ribs 42 and this extension 43 comprises a polygonal contour. In order to save material, recesses 44 are disposed between the edges of the polygonal contour. The same recesses 45 are found between the edges of the polygonal contour of the connecting piece.

The rearward extension 43 performs another function. The axial length comprised between the anchoring point 35 and the rear end of the extension 43 is at least equal to half the outer diameter of the tube, so that this extension maintains the tube in position and it avoids deformations of the tube in flexion propagating to the bead 36 and causing this bead to deform, this risking deteriorating the tightness and weakening the mechanical anchoring of the assembly in the case of repeated flexions of the tube.

Figure 4:
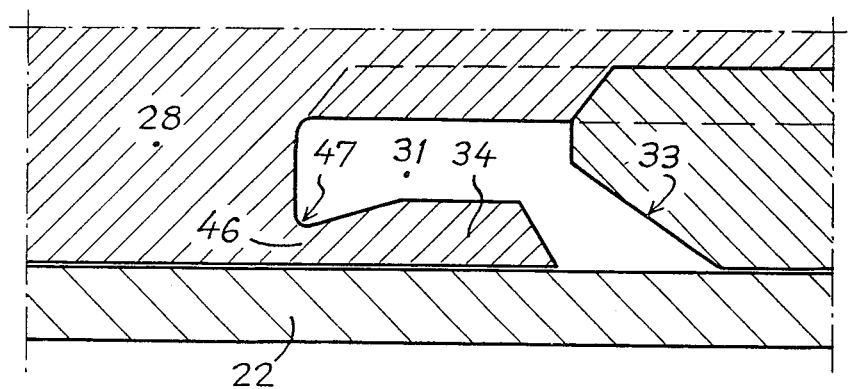
FIGS. 4, 5 and 6 are partial sections through other embodiments.
Figure 5:
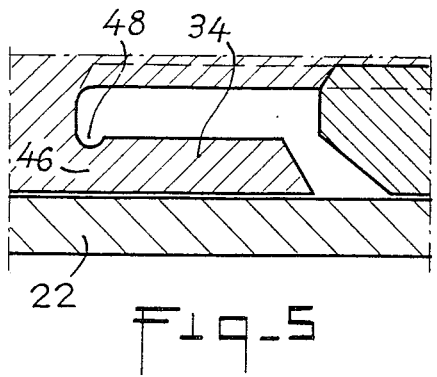
Figure 6:
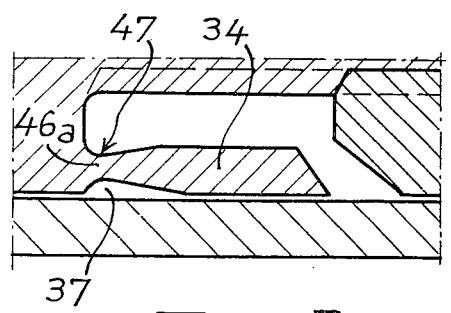

FIGS. 4, 5 and 6 are partial sections, like the section of FIG. 3, which show other embodiments of a union according to the invention.

The function of the inner recess 37 is to facilitate the flexion of the annular lip 34 about its rear end, i.e. about the zone of connection of the lip to the body 28. This same result may be obtained by other equivalent means, particularly by a thinned portion of the rear part of the annular lip 34.

FIGS. 4 and 5 show an embodiment in which the inner face of the annular lip 34 is parallel to the axis of the tube 22. On the other hand, the rear end of the annular lip 34 is connected to the body 28 by a thinned zone 46. In the embodiment of FIG. 4, the thinned zone 46 extends forwardly of the annular lip of which the outer face presents a concave form 47.

In the embodiment of FIG. 5, the thinned portion 46 is determined by a groove 48 made on the outer periphery of the lip 34 about the rear end thereof.

FIG. 6 shows a variant in which the rear end of the annular lip 34 comprises a thinned portion 46a which is due both to an inner recess 37 and to a concavity of the outer face of the annular lip.

We claim:

1. A tube union capable of hermetically connecting a smooth end of a tube on the flared end of a connecting piece which comprises mechanical assembing means which cooperate with assembling means carried by the front end of said union, which union comprises a body having two axially opposite ends, a rear end which has a first axial bore passing through it, said bore having a diameter very slightly greater than the outer diameter of said tube, so that said smooth end may be engaged in said bore, and a front end which has a second axial bore passing therethrough, of which the diameter is clearly greater than the outer diameter of said tube, so that, when said smooth end is engaged in the body of the union, it determines with this second bore an annular cavity in which penetrates said flared end of the connecting piece, which union body further comprises an anchoring and sealing ring which is constituted by an annular lip, which lip is located in said annular cavity, is incorporated in the body of the union to which it is connected by its rear end which surrounds the front end of the first bore and presents, in its rear part, at least one peripheral recess which extends all around the rear end of the said annular lip and which recess is effective to facilitate the flexion of said lip towards the axis from said recess, said lip having a free forward end and a beveled surface extending from a front edge of said forward end, the bevel angle of said beveled surface being selected in relation to the bevel angle of the flared end of the connecting piece such that when in use, the flared end of the connecting piece engages said beveled surface of the lip to flex same toward said axis and thereby forcibly urge said front edge into the material of the tube and form therewith, without cutting the tube, an annular bead that anchors and seals the tube thereat.

2. A union as claimed in claim 1, wherein the inner diameter of the rear part of the said annular lip is clearly greater than the diameter of the first bore, so that, at rest, said annular lip is separated from the outer face of the smooth end of the tube which is engaged in said union by an annular recess.

3. A union as claimed in claim 2, wherein said annular recess extends axially over the whole length of said annular lip and is limited forwardly by the front edge of said lip of which the inner diameter is substantially equal at rest to the outer diameter of said tube.

4. A union as claimed in claim 2, wherein said annular lip is composed, in its rear part, of a cylindrical ring of which the inner diameter is clearly greater than the outer diameter of said smooth end of the tube and in its front part by a truncated washer of which the vertex is directed forwardly and in which said cylindrical ring and said truncated washer have the same thickness and outer and inner walls which are connected to one another without discontinuity.

5. A union as claimed in claim 4, wherein the semi-vertex angle $\gamma$ of said truncated washer is between 1° and 15°.

6. A union as claimed in claim 2, wherein the front end of said annular lip is bevelled and the front face forms with the generatrices of said tube an obtuse angle $\alpha$ of between 100° and 120°.

7. A union as claimed in claim 2, wherein the semi-vertex angle $\beta$ of said flared end is between 15° and 40°.

8. A union as claimed in claim 2, wherein said annular recess comprises an extension to the rear of the rear end of said annular lip.

9. A union as claimed in claim 1, wherein the rear part of said annular lip comprises at least one annular recess which determines a thinned portion of the rear end of said lip.

10. A union as claimed in claim 9, wherein the outer face of the rear end of said annular lip comprises an outer peripheral groove of which the concavity is directed outwardly, which determines said thinned portion.

11. A union as claimed in claim 10, wherein the rear end of said annular lip further comprises, on its inner face, an inner peripheral groove of which the concavity is directed towards the axis, which inner groove determines with said outer groove said thinned portion of the rear end.

12. A union as claimed in claim 1, wherein said union body comprises outer triangular ribs which extend substantially over the length of said annular cavity and a polygonal outer contour for tightening by means of a spanner, wherein said union body comprises an extension extending to the rear of said ribs and said annular cavity and said polygonal contour is located on the periphery of said extension.

* * * * *